US 9,561,854 B2

(12) United States Patent
Schliwa et al.

(10) Patent No.: US 9,561,854 B2
(45) Date of Patent: Feb. 7, 2017

(54) TOILET ARRANGEMENT FOR A VEHICLE

(71) Applicant: Airbus Operations GmbH, Hamburg (DE)

(72) Inventors: Ralf Schliwa, Hamburg (DE); Jens Wiebalck, Hamburg (DE); Roland Lange, Nottensdorf (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 116 days.

(21) Appl. No.: 14/541,610

(22) Filed: Nov. 14, 2014

(65) Prior Publication Data

US 2015/0136903 A1    May 21, 2015

(30) Foreign Application Priority Data

Nov. 15, 2013    (EP) .................................... 13193136

(51) Int. Cl.
B64D 11/00    (2006.01)
B64D 13/00    (2006.01)
(Continued)

(52) U.S. Cl.
CPC ............... B64D 11/02 (2013.01); B64D 11/04 (2013.01)

(58) Field of Classification Search
CPC ............................... B64D 11/02; B64D 11/04
See application file for complete search history.

(56) References Cited

U.S. PATENT DOCUMENTS 5,474,260 A    12/1995 Schwertfeger et al.
7,152,257 B2 *    12/2006 Lasch ................... E04H 1/1216
4/661
(Continued)

FOREIGN PATENT DOCUMENTS

CN    1448301 A    10/2003
DE    4300877 A1    7/1994
(Continued)

OTHER PUBLICATIONS

European Patent Office, European Search Report for European Application No. 13193136.2 mailed Nov. 4, 2014.
(Continued)

Primary Examiner — Philip J Bonzell
(74) Attorney, Agent, or Firm — Lorenz & Kopf, LLP.

(57) ABSTRACT

A toilet assembly for a vehicle comprises a first toilet compartment including a first opening, a first foldable toilet compartment door for closing the first opening, and a first toilet opposite to the first opening. An adjacent second toilet compartment includes a second opening, a second toilet compartment door for closing the second opening, and a second toilet opposite to the second opening. A forward dividing flap is rotatably supported by the front wall and situated between the first toilet compartment and the second toilet compartment for at least partially dividing the first toilet compartment from the second toilet compartment, wherein the forward dividing flap is rotatably supported at the front wall, the first toilet compartment door is retractable to a side facing away from the dividing flap, the first toilet is further from the front wall than is the second toilet, and the forward dividing flap closes the first opening when the first toilet compartment door is retracted.

15 Claims, 7 Drawing Sheets

(51) Int. Cl.
*B64D 11/02* (2006.01)
*B64D 11/04* (2006.01)

(56) References Cited

U.S. PATENT DOCUMENTS

| | | | | |
|---|---|---|---|---|
| 8,672,267 B2* | 3/2014 | Schliwa | ................ | B64D 11/02 244/118.5 |
| 9,346,548 B2* | 5/2016 | Schliwa | ................ | B64D 11/02 |
| 2005/0125891 A1* | 6/2005 | Stratmann | ............. | E04H 1/1216 4/661 |
| 2010/0237193 A1* | 9/2010 | Yoshizaki | ............. | B64C 1/1407 244/129.5 |
| 2013/0001359 A1* | 1/2013 | Schliwa | ................ | B64D 11/02 244/118.6 |
| 2013/0334369 A1* | 12/2013 | Schliwa | ................ | B64D 11/02 244/118.5 |
| 2014/0138483 A1* | 5/2014 | Schliwa | ................ | B64D 11/02 244/118.5 |
| 2014/0291446 A1* | 10/2014 | Reams | ................... | B64D 11/02 244/118.5 |

FOREIGN PATENT DOCUMENTS

| | | | | |
|---|---|---|---|---|
| DE | 202011110232 U1 * | 2/2013 | ............. | B64D 11/02 |
| EP | 1609672 A1 | 12/2005 | | |
| WO | 2011101385 A2 | 8/2011 | | |
| WO | WO 2011101385 A2 * | 8/2011 | ............. | B64D 11/02 |
| WO | 2012110643 A1 | 8/2012 | | |
| WO | WO 2012110643 A1 * | 8/2012 | ............. | B64D 11/02 |

OTHER PUBLICATIONS

The People'S Republic of China, Chinese Office Action for Chinese Patent Application No. 201410640184.8 mailed May 5, 2016.

* cited by examiner

TOILET ARRANGEMENT FOR A VEHICLE

REFERENCE TO RELATED APPLICATIONS

This application claims priority to European Patent Application No. 13 193 136.2, filed Nov. 15, 2013, which is incorporated herein by reference in its entirety.

TECHNICAL FIELD

The subject matter described herein generally relates to a toilet arrangement for a vehicle, and more specifically relates to a toilet arrangement for an aircraft, as well as a monument for a cabin of a vehicle.

BACKGROUND

In the design of passenger cabins for use in vehicles, one important objective is the maximization of the available number of passenger seats. This number is limited by the number of mandatory seats for crew members, as well as mandatory safety devices, arbitrary service equipment and toilets. The proportion of the number of passenger seats to the remaining equipment in passenger cabins is a factor that co-determines the operating efficiency of an aircraft in scheduled air traffic. In addition to official certification regulations and operating permits of vehicles, the operators of the vehicles also need to take into account customer's needs such as, for example, customized special installations in the selection of seat sizes, seat spacings, service equipment, and toilets. Depending on the design of fixtures in the passenger cabin and their space requirement, intelligent construction and configuration solutions can optimize the number of passenger seats.

For space reasons and lack of regulations, certain vehicles according to the prior art merely comprise standard toilets, without providing separate toilets for persons with limited mobility. For example, it should be possible for handicapped individuals to enter "handicapped toilets" with a wheelchair. Handicapped toilets of this type require much more installation space and are scarce, particularly in aircraft, because they significantly reduce the operating efficiency of the aircraft in question and are used very infrequently.

DE 43 00 877 A1 and U.S. Pat. No. 5,474,260 A describe an aircraft including service equipment and toilets that are designed in the form of independent conventional toilet compartments.

It would therefore be desirable to provide a toilet configuration for use in a vehicle (e.g. an aircraft) that is usable by both handicapped and non-handicapped individuals.

In addition, other objects, desirable features and characteristics will become apparent from the subsequent summary and detailed description, and the appended claims, taken in conjunction with the accompanying drawings and this background.

SUMMARY

This summary is provided to introduce a selection of concepts in a simplified form that are further described below in the detailed description. This summary is not intended to identify key or essential features of the claimed subject matter, nor is it intended to be used as an aid in determining the scope of the appended claims.

In a first embodiment, there is provided a toilet arrangement for a vehicle that can be used by persons with limited mobility, without excessively restricting the operating efficiency of the vehicle.

In a further embodiment, there is provided a toilet assembly for a vehicle, comprising a first toilet compartment comprising a first opening, a first foldable toilet compartment door for closing the first opening, and a first toilet opposite to the first opening; and an adjacent second toilet compartment comprising a second opening, a second toilet compartment door for closing the second opening, and a second toilet opposite to the second opening. A front wall and a forward dividing flap rotatably supported by the front wall is provided and is situated between the first toilet compartment and the second toilet compartment for at least partially dividing the first toilet compartment from the second toilet compartment. The first toilet compartment door is retractable to a side facing away from the dividing flap, the first toilet is further from the front wall than is the second toilet, and the forward dividing flap closes the first opening when the first toilet compartment door is retracted.

In yet another embodiment, there is provided monument for use on an aircraft, comprising a first toilet compartment comprising a first opening, a first foldable toilet compartment door for closing the first opening, and a first toilet opposite to the first opening; and an adjacent second toilet compartment comprising a second opening, a second toilet compartment door for closing the second opening, and a second toilet opposite to the second opening. A front wall and a forward dividing flap rotatably supported by the front wall is provided and is situated between the first toilet compartment and the second toilet compartment for at least partially dividing the first toilet compartment from the second toilet compartment. A galley section is in lateral engagement with the first toilet section, wherein the first toilet compartment door is retractable to a side adjacent the galley section, the first toilet is further from the front wall than is the second toilet, and the forward dividing flap closes the first opening when the first toilet compartment door is retracted.

In still a still further embodiment there is provided a toilet assembly for a vehicle, comprising a first toilet compartment comprising a first opening, a first foldable toilet compartment door for closing the first opening and a first toilet opposite to the first opening; and an adjacent second toilet compartment comprising a second opening, a second toilet compartment door for closing the second opening and a second toilet opposite to the second opening. A substantially planar front wall, and a forward dividing flap rotatably supported by the planar front wall are provided and situated between the first toilet compartment and the second toilet compartment for at least partially dividing the first toilet compartment from the second toilet compartment, wherein the first toilet compartment door is a bi-fold door and retractable to a side facing away from the dividing flap, the first toilet is further from the front wall than is the second toilet, the forward dividing flap closes the first opening when the first toilet compartment door is retracted, and the first toilet compartment and the second toilet compartment each have a main direction of extension parallel to each other. The forward dividing flap is rotatably supported at the front wall, and the first toilet is further from the front wall than the second toilet. The dividing flap is adapted for closing the first opening when the first toilet compartment door is retracted.

Advantageous embodiments and further improvements may be gathered from the claims and the following detailed description.

Hence, the toilet arrangement comprises two toilet compartments that are separated by at least the forward dividing flap, which is situated between the first and second toilet compartments. In case a person with reduced mobility desires to enter a toilet compartment by means of a wheelchair, the foldable door may be retracted to the side facing away from the second compartment. With the foldable door open, the first opening allows the person to enter the first toilet compartment. By moving the forward dividing flap through rotation around a rotational axis at the front wall, which rotational axis should be vertical to a floor on which the toilet arrangement is positioned, it may be used as a door for closing the first opening. However, due to its rotation, the forward dividing flap no longer separate the two toilet compartments, and the toilet arrangement according to the embodiment provides a single, but clearly larger toilet compartment. The size of the combined toilet compartment is substantially equal to the sum of the sizes of the first and second toilet compartments.

A great advantage lies in the fact that the distance from the first opening to the first toilet is larger, allowing a wheelchair to enter the first toilet compartment and allowing a person to leave the wheelchair to reach the second toilet in the second toilet compartment. Due to the large available space, the wheelchair may completely remain in the first toilet compartment even when the first opening is closed by the forward dividing flap.

Closing the first opening by means of the forward dividing flap requires an adequate locking assembly for holding the forward dividing flap in a closed position just as the first toilet compartment door. For this purpose, the locking assembly of the first toilet compartment door may be adapted for engaging with a locking assembly of the forward dividing flap, such that the forward dividing flap may provide a positive or non-positive connection with the first toilet compartment door when the forward dividing flap is swept forward to close the first opening. As an alternative, a part of the front wall or an additional component behind or in front of a support of the first toilet compartment door may comprise suitable locking means for providing an engagement with the forward dividing flap.

In a further embodiment, the first toilet compartment and the second toilet compartment have a main direction of extension, which are parallel to each other. Hence, both toilet compartments primarily extend into the same direction and the wall, which extends along the largest length of at least the second toilet compartment, may at least partially be removed to combine the available space of the toilet compartments. Still further, as both toilet compartments extend into the same directions, they may constitute a separate lateral section of a larger cabin monument, which does not obstruct any adjacent lateral installation space for trolley compartments etc.

In a further embodiment, the front wall of the toilet arrangement is even. The first opening and the second opening therefore are positioned in the same plane and provide a harmonic, aesthetic appearance without any steps, protrusions, or edges extending into a free space of the vehicle. This is particularly useful for space efficient passenger cabins and allows passengers to pass the front wall in a short distance without having to avoid protrusions or sharp edges if other passengers are standing next to the front wall and partially obstruct the available space.

In a still further embodiment, an upper rear dividing flap is rotatably supported in a region between the first toilet and the second toilet The upper rear dividing flap extends from a height above the first toilet to a ceiling region of the first and second toilet compartments and wherein the upper rear dividing flap is adapted for at least partially separating the first toilet compartment from the second toilet compartment and for rotating to a position directly above the first toilet. The forward dividing flap, which is supported at the front wall, cannot extend along the whole wall between the first and second toilet compartment. Its is determined by the width of the first opening, since the forward dividing flap needs to be able to replace the first toilet compartment door. Hence, the remaining space in a height above an upper delimitation of the first and second toilet may at least partially be bridged by the rear division panel, which may be moved out of the way into a position directly above the first toilet. As described above, the person with reduced mobility would enter the first toilet compartment and would leave the wheelchair in this compartment directly in front of the first toilet. Consequently, the first toilet cannot be used by this person at all. Moving the upper rear dividing flap into a position directly above the first toilet therefore does not obstruct any usable component in this compartment. The upper rear dividing flap may comprise a lower edge, which extends approximately 5 to 15 mm above an upper surface of the first toilet.

However, as the upper rear dividing flap does not extend from the ceiling of the first and second toilet compartment to the floor, a lower rear dividing flap is rotatably supported in a region between the first toilet and the second toilet and extends substantially from a floor of the first toilet compartment and the second toilet compartment to the upper rear dividing flap. A bottom portion of the wall between the first and the second toilet compartment may thereby be unobstructed by rotating the lower rear dividing flap to a position, in which the lower rear dividing flap preferably snugly aligns with the second toilet. Hence, the lower rear dividing flap should be rotated in a direction opposite to the direction of rotation of the upper rear dividing flap. Besides providing a clear guidance function for the person on the wheelchair, sufficient space is provided to easily rotate the wheelchair, which has entered the first toilet compartment, into a position, wherein the wheelchair touches the lower rear dividing flap. Thus, a clear delimitation of the wheelchair's motion is given, and the second toilet may be protected from being accidentally hit by the wheelchair. Further, the person with reduced mobility may more easily reach the second toilet from the wheelchair.

Still further, a flexible sealing element may be arranged between the upper rear dividing flap or the lower rear dividing flap. The sealing element may be fastened either to the upper rear dividing flap or to the lower rear dividing flap. However, it may be advantageous to fasten the sealing element to the upper rear dividing flap, such that it may be compressed when the upper rear dividing flap is rotated to a position above the first toilet. In this case, the sealing element may temporarily hold the upper rear dividing flap in this position.

As an alternative, the upper rear dividing flap may comprise a locking feature at an edge opposite to a rotational axis of the upper rear dividing flap. The locking means is adapted for engaging a corresponding locking feature at a lateral or rear wall of the first toilet compartment. If the first and second toilet compartments are combined, the upper rear dividing flap may reliably be secured in its swept back position.

In a further embodiment, the first toilet comprises a compartment for a vehicle attendant seat, into which a vehicle attendant seat may be stowed when it is not used. This may be accomplished by means of a swivelable seat supporting adapter on rails extending into the vehicle attendant seat compartment. Due to the fact that the distance of the first toilet to the first opening is larger than the distance of the second toilet to the second opening, there is a relatively large space available to enter the compartment. For this purpose, an interior wall of the first toilet compartment may comprise a protrusion or an inwards directed shift. The vehicle attendant seat compartment is located at the outside of the first toilet compartment. A wash basin may be arranged inside the first toilet compartment right next to the protrusion. The wash basin may extend into the interior of the first toilet compartment about the same measure as the protrusion. Consequently, a harmonic and aesthetic appearance is provided in the interior of the first toilet compartment despite the integration of such a non-toilet related function.

Also contemplated is a toilet arrangement and a galley section in a lateral arrangement. The galley section comprises a plurality of stowage compartments for exemplarily stowing trolleys. As none of the toilet compartments extends behind the galley section, there is no limitation in the available stowage depth for the galley section, such that two or more trolleys may be stowed one behind each other.

In an embodiment, the monument is positioned directly in front of a pressure bulkhead in an aircraft cabin and extends from a first lateral fuselage wall to an opposite lateral fuselage wall. Due to its position directly in front of the pressure bulkhead, which approximately has the shape of a spherical cap, the available depth for components in the middle of the monument exceeds the available depth in the outer regions. Hence, the first toilet compartment may comprise a clearly larger extension than the second toilet compartment. This permits shifting the first toilet further away from the first opening than would be possible with the second toilet relative to the second opening.

BRIEF DESCRIPTION OF THE DRAWINGS

The various embodiments will hereinafter be described in conjunction with the following drawing figures, wherein like numerals denote like elements, and wherein.

Other characteristics, advantages and potential applications will be better understood from the following detailed description of the exemplary embodiments taken in conjunction with the following drawings.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
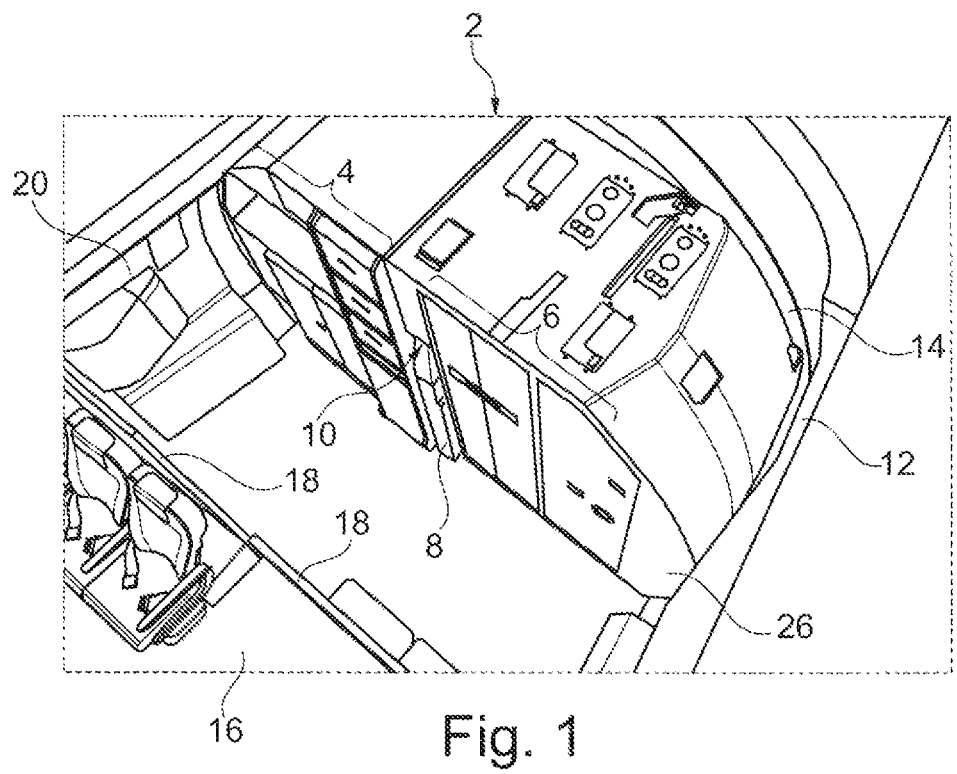
FIG. 1 is a three-dimensional view of a toilet assembly for use in an aircraft cabin monument in accordance with an exemplary embodiment.
Figure 11:
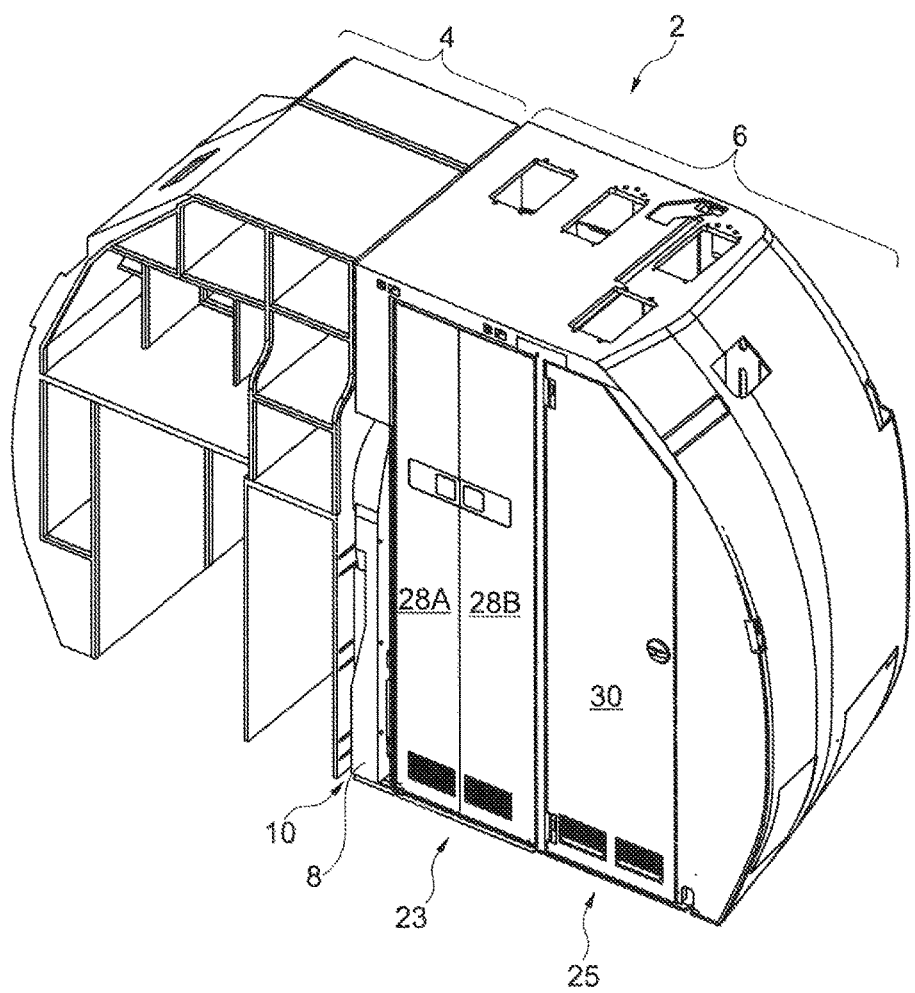

FIGS. 1 and 11 are three-dimensional views of a monument 2 having a galley section 4 and a toilet arrangement 6 as well as a flight attendant seat 8, which is stowable in a flight attendant seat compartment 10. Monument 2 is located at a rearmost position in an aircraft fuselage 12, directly in front of a pressure bulkhead 14, which has the shape of a spherical cap and defines a rear end of a pressurized passenger compartment 16.

In front of the monument 2, i.e. in a flight direction forward of monument 2, partition walls 18 are situated that divide a passenger seating area from an exit area in the vicinity of an aircraft door 20. Here, passengers may stand while waiting for the toilet arrangement 6 to be available.

While the galley section 4 in FIG. 1 is equipped with a plurality of trolleys and containers, in FIG. 11 the galley section 4 is basically empty.

Figure 2:
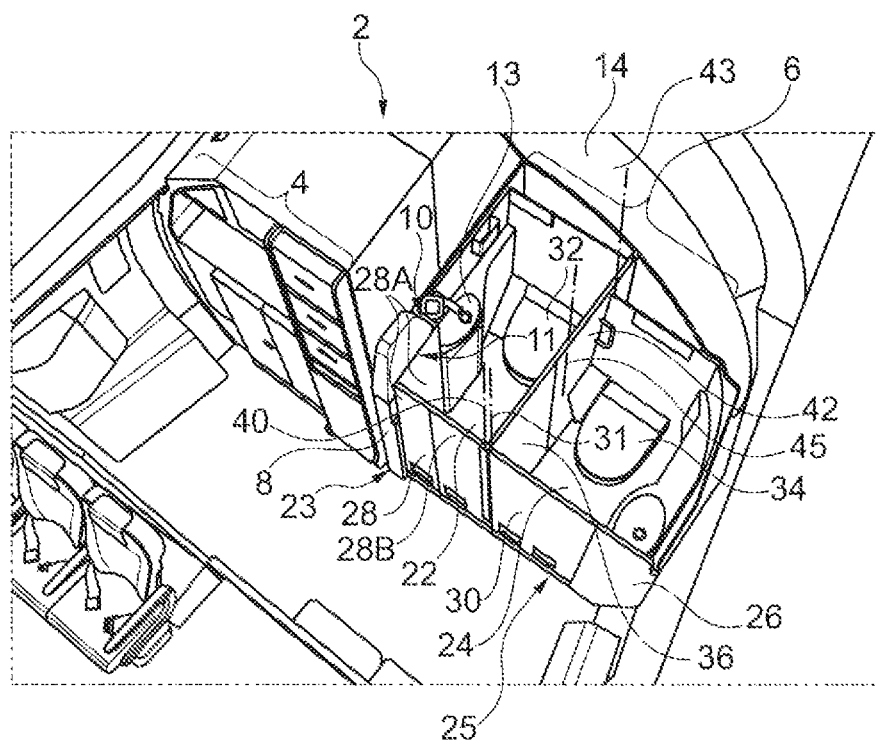
FIG. 2 is a partial sectional view of the toilet assembly shown in FIG. 1.
Figure 10:
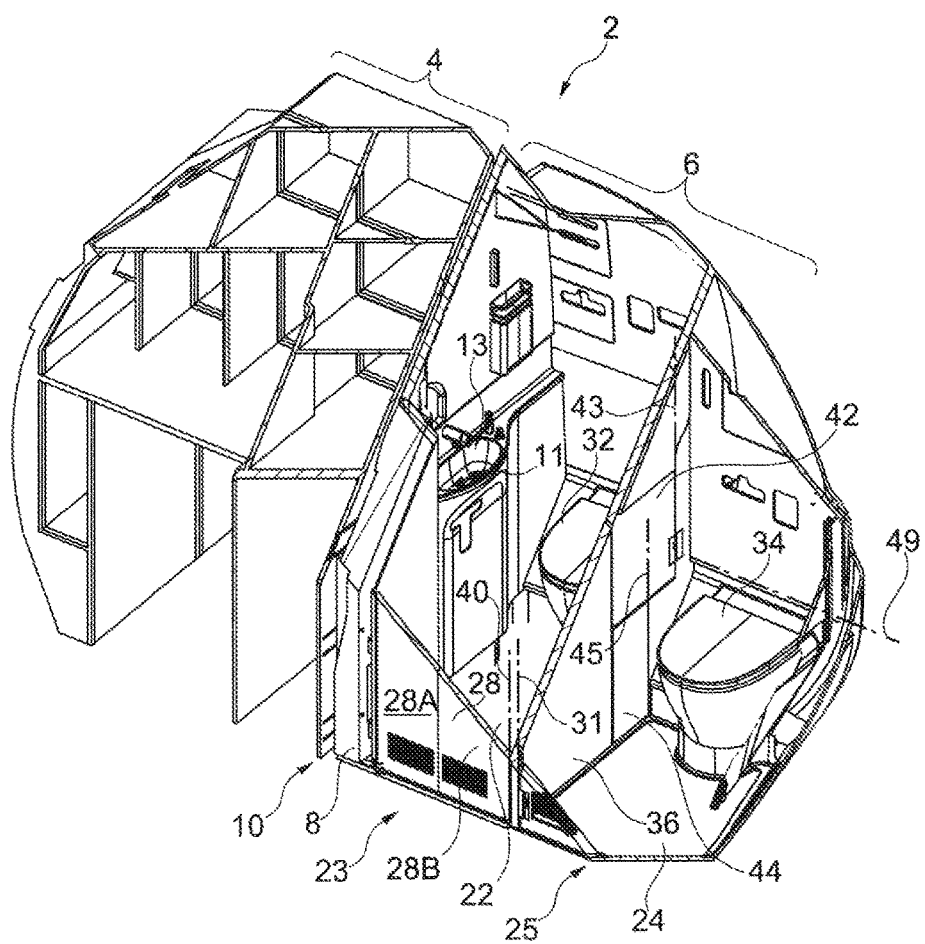

The same monument 2 is shown in FIGS. 2 and 10, wherein the toilet arrangement 6 is shown in a sectional view. Here, a first toilet compartment 22 is arranged in an inward position, and a second toilet compartment 24 is arranged between the first toilet compartment 22 and an inner surface of the fuselage 12 (FIG. 12). The first toilet compartment 22 and the second toilet compartment 24 have a common front wall 26 with a first opening 23 and a second opening 25, which front wall 26 is substantially even, i.e. without steps, protrusions or different extensions in the direction of flight. A first toilet compartment door 28 and a second toilet compartment door 30, which differ in their designs, are integrated into the front wall 26. The first toilet compartment door 28 is a bi-fold door, which comprises two lateral door sections 28A and 28B, while the second toilet compartment door 30 is a plane door with only one hinge.

Due to the arrangement at a rear section in front of the pressure bulkhead 14, the first toilet compartment 28 extends further against the direction of flight than the second toilet compartment 24. This makes it possible to arrange a toilet 32 in the first toilet compartment 22 further rearward than a toilet 34 in the second toilet compartment 24. Besides allowing the flight attendant seat compartment 10 to extend into the installation space of the first toilet compartment 22, it also allows the first toilet compartment 22 and the second toilet compartment 24 to be combined in order to allow a disabled person to enter the combined toilet compartment as described with the following figures. To provide enough space for the vehicle attendant seat stowage compartment 10, the first toilet compartment 22 comprises a protrusion 11, which extends the width of the vehicle attendant seat stowage compartment 10. Behind protrusion 11, i.e. against the direction of flight, a wash basin 13 is arranged that has an installation depth that substantially corresponds to the protrusion 11.

Figure 3:
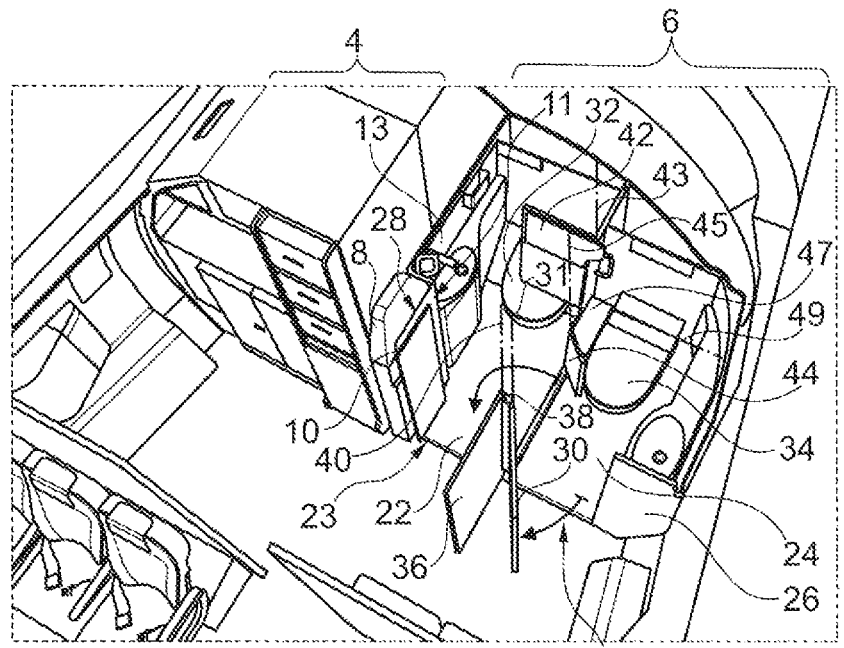
FIGS. 3 to 6 illustrate a person with limited mobility entering the toilet assembly of FIG. 1.
Figure 9:
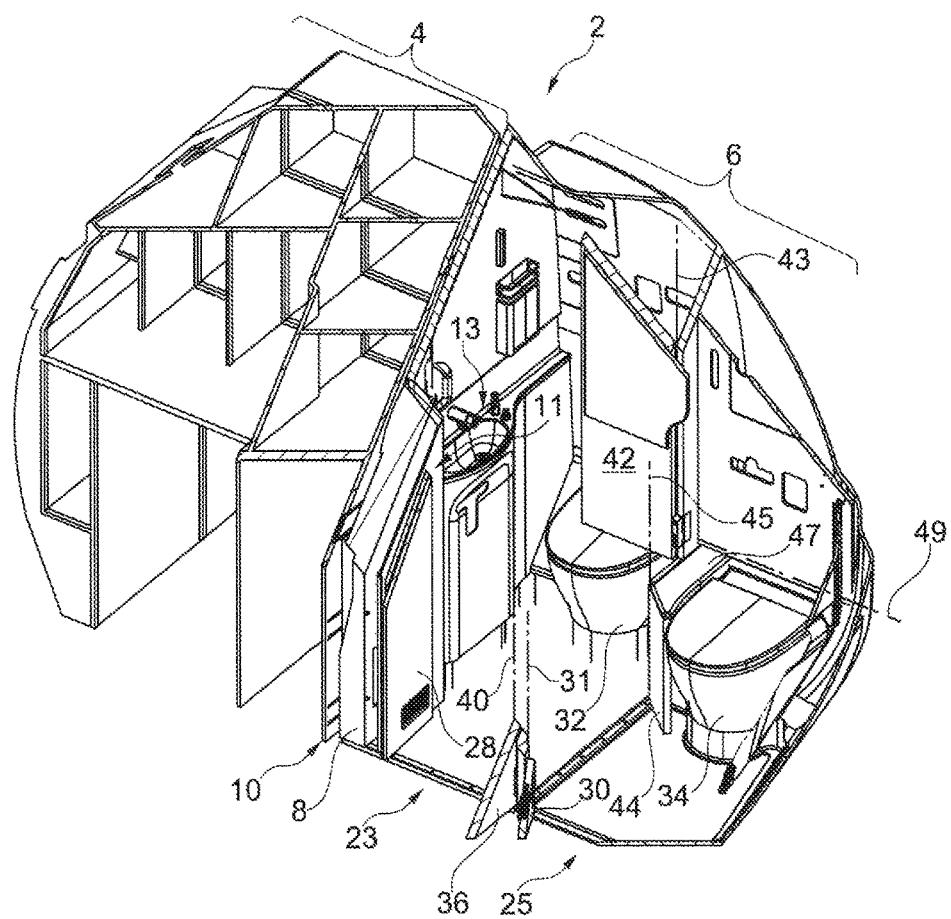
FIGS. 9 to 11 illustrate the toilet assembly of FIGS. 1-3 with wireframe drawings.

Referring to FIGS. 3 and 9, a forward dividing flap 36, which at least partially divides the first toilet compartment 22 from the second toilet compartment 24, may be swiveled from a closed position to an open position. The dividing flap 36 therefore is supported on a hinge 38 that allows swiveling, i.e. rotating, the forward dividing flap 36 around a substantial vertical hinge axis 40.

In order to not obstruct the first toilet compartment 22, the first toilet compartment door 28 is folded to rest against the wall at the flight attendant seat compartment 10, i.e. opposite hinge 38. Also, the second toilet compartment door 30 is opened through rotation around a substantial vertical rotational axis 31, which is parallel and adjacent to the rotational axis 40.

Further, an upper rear dividing flap 42, which may be arranged between the first toilet 32 and the second toilet 34, is swiveled from a closed position to an open position around a rotational axis 43, which is arranged between the first toilet 32 and the second toilet 34. The upper rear dividing flap 42 extends from a height just above the first toilet 32 to a ceiling region of the first and second toilet compartments 22 and 24. By swiveling the upper rear dividing flap 42 into an open position, it extends directly into a position above the first toilet 32 since the first toilet 32 is not needed when the first and second toilet compartments 22 and 24 are combined to become a common compartment.

In a lower section between the first toilet 32 and the second toilet 34, a lower rear dividing flap 44 is located, which may be swiveled around a substantial vertical rotational axis 45, from a closed position until it reaches a position just adjacent to the second toilet 34. The lower rear dividing flap 44 snugly fits against the second toilet 34 and provides a maximum possible, unobstructed space inside the first and second toilet compartments 22 and 24. Further, it provides clear guidance to a person on a wheelchair 46 regarding how much the wheelchair 46 may be rotated.

After rotating the lower rear dividing flap 44 in this manner, a flat and rotatably supported bridge component 47 can be moved on top of the lower rear dividing flap 44. A rotational axis 49, around which the bridge component 47 can be rotated, may be horizontal and extend perpendicular to a dividing plane between the first toilet compartment 22 and the second toilet compartment 24, i.e. extending between both toilet compartments 22 and 24, preferably extending parallel to the lateral (y) axis of the aircraft in a standard aircraft fixed coordinate system, when monument 2 is arranged at the rear end of the cabin and preferably located at an end of the second toilet compartment 24 opposite to the first opening 25. When toilet compartments 22 and 24 are not divided, the bridge component 47 is swept back into a rear wall portion of the second toilet compartment 24, where it preferably disappears behind a respective flap, in a recess or may simply be locked through a positive or non-positive locking means, such as a magnet, hook, latch, or the like.

Figure 4:
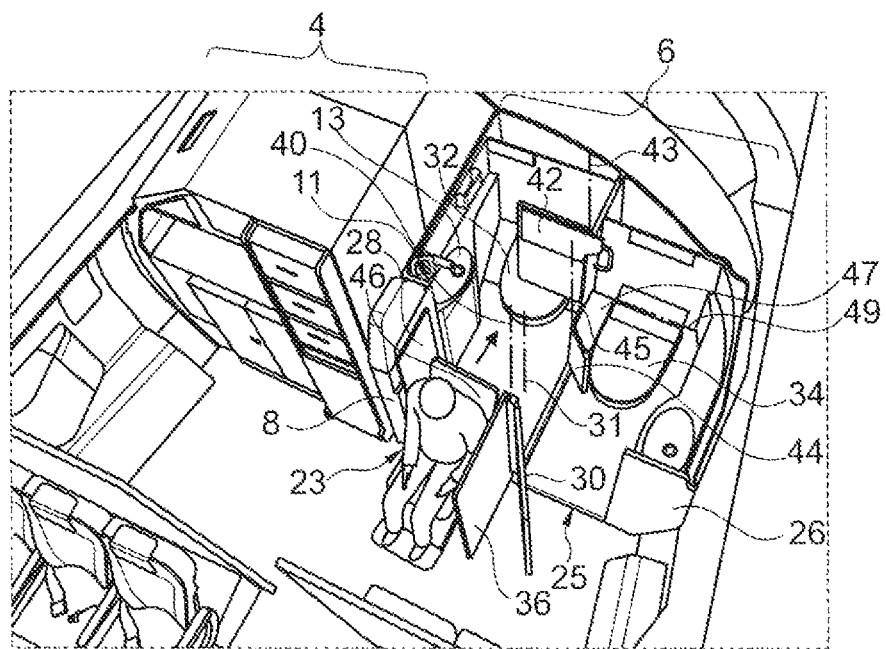

As FIG. 4 shows, a disabled person on a wheelchair 46 may enter the first toilet compartment 22 through the space between the folded first toilet compartment door 28 and the forward swept dividing flap 36.

Figure 5:
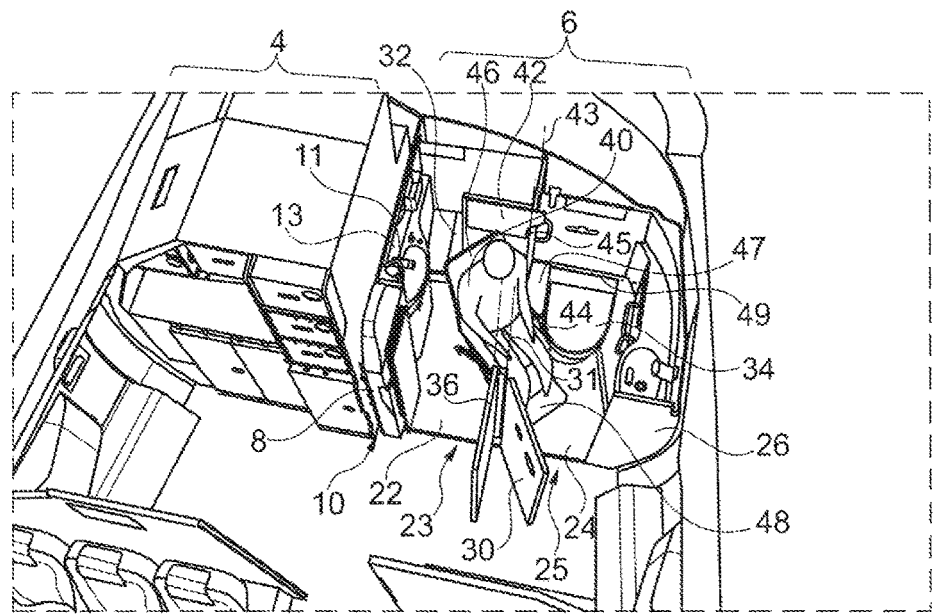

Referring to FIG. 5, the wheelchair 46 may be turned around a vertical axis after completely entering the first toilet compartment 22. This is possible, since the rearward shifted first toilet 32 leaves sufficient available space. During the rotation, the wheelchair 46 assumes a substantially diagonal position, in which a side of the wheelchair 46 comes into contact with the lower rear dividing flap 44 that rests against the second toilet 34. In this position, a front end 48 of wheelchair 46 extends into the second toilet compartment 24.

Figure 6:
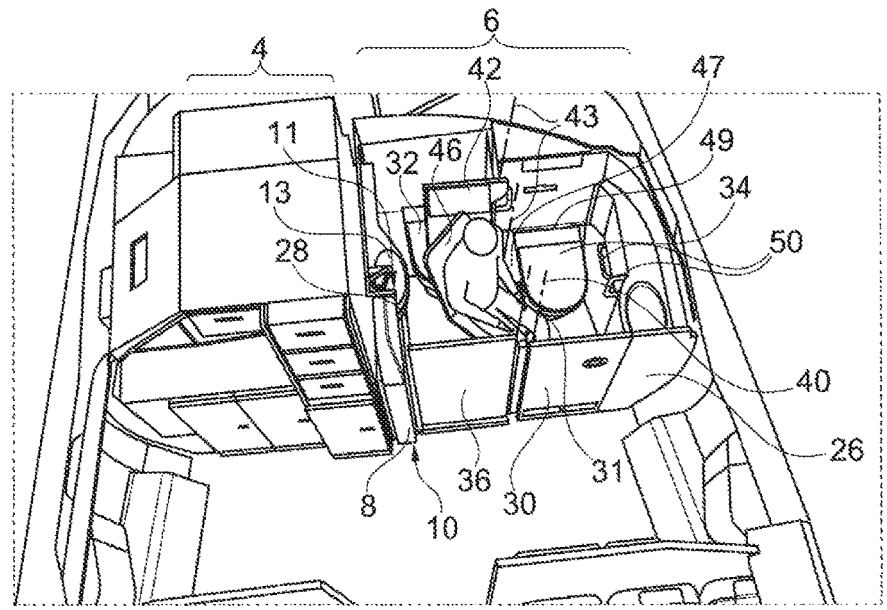

After entering the first toilet compartment 22 and conducting the above shown rotation, the forward dividing panel 36 is swept back in such a manner, that it closes the opening of the first toilet compartment 22 and rests against the folded first toilet compartment door 28 as shown in FIG. 6. Further, the second toilet compartment door 30 is closed. Consequently, the first and second toilet compartments 22 and 24 are no longer divided, and the person sitting on the wheelchair 46 may easily reach the second toilet 34 and leave the wheelchair 46 in its position. Handles 50 are provided inside the second toilet compartment 24 to improve the mobility of the person.

Due to the novel arrangement of the first and second toilets 32 and 34 in a longitudinally shifted alignment, an improved toilet arrangement 6 is provided. Further, the galley section 4 may extend along the whole lateral and longitudinal installation space such that an increased number of trolleys may be stored in the galley section 4.

Figure 7:
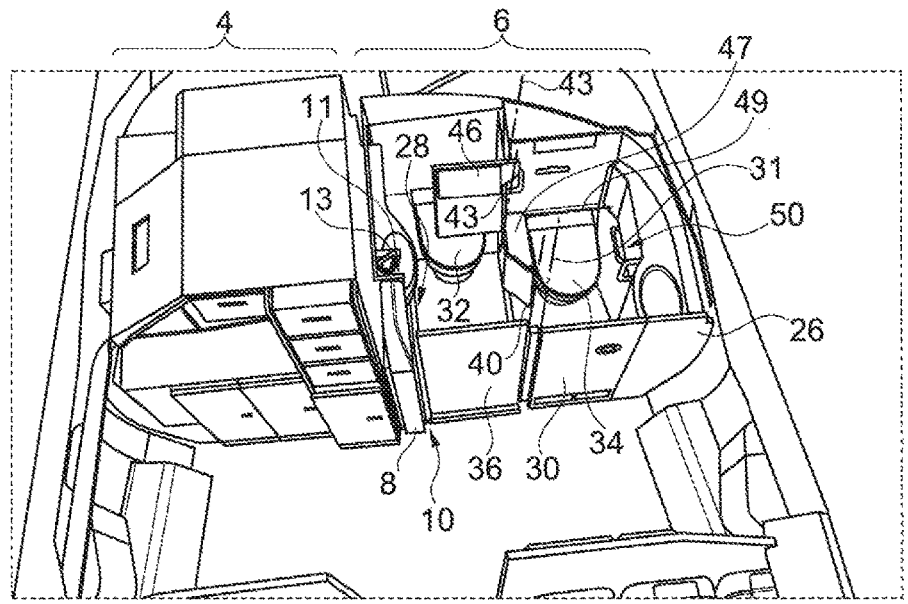
FIG. 7 is a further view of the toilet assembly of FIG. 6 excluding the person and wheelchair.
Figure 8:
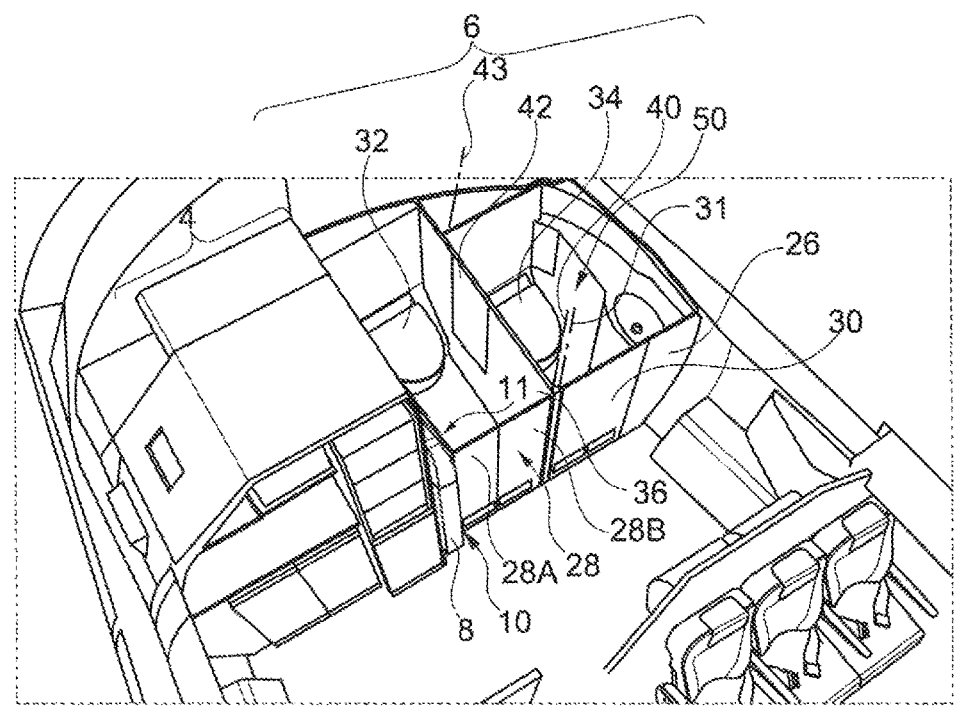
FIG. 8 is a further view of the toilet assembly of FIG. 2.

In FIGS. 7 and 8, monument 2 is shown from another viewing angle with an open upper division panel and an open lower division panel in a combined (disabled) mode (FIG. 7) and in a normal mode, wherein the first toilet compartment 22 and the second toilet compartment 24 are separate (FIG. 8).

As a supplement, it should be noted that "comprising" does not exclude any other elements or steps, and that "a" or "an" does not exclude a plurality. It should furthermore be noted that characteristics described with reference to one of the above exemplary embodiments can also be used in combination with other characteristics of other above-described exemplary embodiments. Reference symbols in the claims should not be interpreted in a restrictive sense.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A toilet assembly for a vehicle, comprising:
    a first toilet compartment comprising a first opening, a first foldable toilet compartment door for closing the first opening, and a first toilet opposite to the first opening;
    an adjacent second toilet compartment comprising a second opening, a second toilet compartment door for closing the second opening, and a second toilet opposite to the second opening;
    a front wall; and
    a forward dividing flap rotatably supported by the front wall and situated between the first toilet compartment and the second toilet compartment for at least partially dividing the first toilet compartment from the second toilet compartment,
    wherein the first toilet compartment door is retractable to a side facing away from the forward dividing flap,
    wherein the first toilet is further from the front wall than is the second toilet, and
    wherein the forward dividing flap closes the first opening when the first toilet compartment door is retracted.

2. The toilet assembly of claim 1, wherein the first foldable compartment door is a bi-fold door.

3. The toilet assembly of claim 1, wherein the first toilet compartment and the second toilet compartment each have a main direction of extension parallel to each other.

4. The toilet assembly of claim 1, wherein the front wall is substantially planar.

5. The toilet assembly of claim 1, further comprising an upper rear rotatable dividing flap supported in a region between the first toilet and the second toilet,
    wherein the upper rear dividing flap rotates to a position directly above the first toilet and extends from a height above the first toilet to a ceiling region of the first toilet compartment and the second toilet compartment, and
    wherein the upper rear dividing flap is adapted for at least partially separating the first toilet compartment from the second toilet compartment.

6. The toilet assembly of claim 1 further comprising a vehicle attendant seat compartment at the first toilet compartment, into which a vehicle attendant seat is stowable in case it is not used.

7. The toilet assembly of claim 1, further comprising an upper rear dividing flap that is rotatably supported in a region between the first toilet and the second toilet, and a lower rear dividing flap that is rotatably supported in a region between the first toilet and the second toilet and extends substantially from a floor of the first toilet compartment and the second toilet compartment to the upper rear dividing flap.

8. The toilet assembly of claim 7, further comprising a flexible sealing element arranged between the upper rear dividing flap and the lower rear dividing flap,
wherein the sealing element is fastened either to the upper rear dividing flap or to the lower rear dividing flap.

9. The toilet assembly of claim 7, wherein the upper rear dividing flap comprises locking means at an edge opposite to a rotational axis of the upper rear dividing flap, and wherein the locking means is adapted for engaging corresponding locking means at a lateral or rear wall of the first toilet compartment.

10. A monument for use on an aircraft, comprising:
a first toilet compartment comprising a first opening, a first foldable toilet compartment door for closing the first opening, and a first toilet opposite to the first opening;
an adjacent second toilet compartment comprising a second opening, a second toilet compartment door for closing the second opening, and a second toilet opposite to the second opening;
a front wall;
a forward dividing flap rotatably supported by the front wall and situated between the first toilet compartment and the second toilet compartment for at least partially dividing the first toilet compartment from the second toilet compartment; and
a galley section in lateral engagement with the first toilet section,
wherein the first toilet compartment door is retractable to a side adjacent the galley section,
wherein the first toilet is further from the front wall than is the second toilet, and
the forward dividing flap closes the first opening when the first toilet compartment door is retracted.

11. A toilet assembly for a vehicle, comprising:
a first toilet compartment comprising a first opening, a first foldable toilet compartment door for closing the first opening and a first toilet opposite to the first opening;
an adjacent second toilet compartment comprising a second opening, a second toilet compartment door for closing the second opening and a second toilet opposite to the second opening;
a substantially planar front wall; and
a forward dividing flap rotatably supported by the planar front wall and situated between the first toilet compartment and the second toilet compartment for at least partially dividing the first toilet compartment from the second toilet compartment;
wherein the first toilet compartment door is a bi-fold door and retractable to a side facing away from the dividing flap,
wherein the first toilet is further from the front wall than is the second toilet,
wherein the forward dividing flap closes the first opening when the first toilet compartment door is retracted, and
wherein first toilet compartment and the second toilet compartment each have a main direction of extension parallel to each other.

12. The toilet assembly of claim 11, further comprising comprising an upper rear rotatable dividing flap supported in a region between the first toilet and the second toilet,
wherein the upper rear dividing flap rotates to a position directly above the first toilet and extends from a height above the first toilet to a ceiling region of the first toilet compartment and the second toilet compartment, and
wherein the upper rear dividing flap is adapted for at least partially separating the first toilet compartment from the second toilet compartment.

13. The toilet assembly of claim 12 further comprising:
a lower rear dividing flap that is rotatably supported in a region between the first toilet and the second toilet a lower rear dividing flap, which is rotatably supported in a region between the first toilet and the second toilet and extends substantially from a floor of the first toilet compartment and the second toilet compartment to the upper rear dividing flap; and
a flexible sealing element arranged between the upper rear dividing flap and the lower rear dividing flap,
wherein the sealing element is fastened either to the upper rear dividing flap or to the lower rear dividing flap.

14. The toilet assembly of claim 13,
wherein the upper rear dividing flap comprises a lock at an edge opposite to a rotational axis of the upper rear dividing flap, and
wherein the lock is adapted for engaging a corresponding lock at a lateral or rear wall of the first toilet compartment.

15. The toilet assembly of claim 14 further comprising a vehicle attendant seat compartment at the first toilet compartment, into which a vehicle attendant seat is stowable in case it is not in use.

* * * * *